United States Patent

[11] 3,629,590

[72] Inventor Alfred L. Case
College Park, Md.

[21] Appl. No. 792,597
[22] Filed Jan. 21, 1969
[45] Patented Dec. 21, 1971
[73] Assignee Versitron, Inc.
Washington, D.C.
Continuation-in-part of application Ser. No. 428,347, Jan. 27, 1965, now Patent No. 3,462,606. This application Jan. 21, 1969, Ser. No. 792,597

[54] PHOTOELECTRIC RELAY USING OPTICAL COUPLES
17 Claims, 9 Drawing Figs.

[52] U.S. Cl. .......... 250/208, 250/209, 307/311
[51] Int. Cl. .......... H01j 39/12
[50] Field of Search .......... 250/208, 209; 307/311

[56] References Cited

UNITED STATES PATENTS

| | | | |
|---|---|---|---|
| 3,283,157 | 11/1966 | Blackmer .......... | 250/209 |
| 3,283,237 | 11/1966 | Williams et al. .......... | 250/209 |
| 3,321,631 | 5/1967 | Biard et al. .......... | 250/209 |

*Primary Examiner*—James W. Lawrence
*Assistant Examiner*—Martin Ambramson
*Attorney*—Le Blanc & Shur

ABSTRACT: Disclosed is an isolator switch or relay for isolating an electrical input and output. It comprises a pair of optical source-detector couples in which the sources are alternately overdriven over a low duty cycle to provide a rapid response. Input and output logic elements are connected to the couples, the former providing alternate time-spaced signals to the couples and the latter recovering the polarity of the input signal. Improved electromagnetic isolation between opposite sides of the couple as well as strobing and termination circuits are provided. The switch is adapted for use in all types of digital data communication circuits.

INVENTOR
ALFRED L. CASE
BY
Le Blanc & Shur
ATTORNEYS

INVENTOR
ALFRED L. CASE

BY

LeBlanc & Shur
ATTORNEYS

PATENTED DEC 21 1971

3,629,590

PHOTOELECTRIC RELAY USING OPTICAL COUPLES

This application is a continuation-in-part of copending application Ser. No. 428,347, filed Jan. 27, 1965, entitled "Relay", now U.S. Pat. No. 3,462,606, issued Aug. 19, 1969.

This invention relates to a solid-state switching device or relay for isolating an electrical input from the electrical output of the device. More particularly, it relates to an improved solid-state relay for propagating a digital data signal over an electrooptical isolation path.

There is disclosed in copending application Ser. No. 428,347, filed Jan. 27, 1965, an improved solid-state relay utilizing an optical transmission path for improving the isolation between electrical input and output circuits. The relay of the copending application is particularly adapted for use as a direct substitute for the more conventional electromagnetic relays used in teletype and similar circuits.

The present invention is directed to a relay of the same general type having improved signal isolation, more rapid speed of operation and one that is adapted for use in all types of digital data circuits.

It is common in digital data communications and in data processing to propagate data in binary form. In using electrooptical isolators for these signals, it is customary to represent one of the two binary states by an illuminated condition and the other binary state by a dark condition. However, this technique sets performance limitations on the optical couple due to the sensitivities, efficiencies and maximum power dissipations of the optical devices used based upon the maximum radiation levels obtainable with the optical devices. That is, the radiation levels obtainable with source devices which are suitable for high-speed data switching (typically gallium arsenide diodes) are power dissipation limited as to maximum performance.

The relay of the present invention overcomes this difficulty by increasing the effective light level of the source-detector couple without increasing the average power dissipation in the couple. This is accomplished by using two identical source and detector couples, both driven from the same logic source and terminated by a common logic element. Further, the drive circuit between the logic source and the radiation source diodes is such as to drive the source diodes with a pulse of current shorter than the data bit width and of greater magnitude than would be possible as a steady-state (or DC) magnitude as limited by power dissipation. The ratio of the "on" to "off" time, herein defined as the "duty cycle" for a given diode, is substantially decreased. Therefore, it is possible to "overdrive" the diode over a short duty cycle without exceeding the power dissipation levels or any other limits of the optical couple. Two diodes are required because the detector outputs are monopolar and therefore do not contain the polarity or direction information. That is, each diode is pulsed for a logic change of one direction but not for a transition in the opposite direction.

By in effect "overdriving" two diodes, it is possible to obtain one or any combination of increased speed of data handling, increased frequency bandwidth, increased signal-to-noise ratio, reduced transmitter power consumption, faster signal rise-time, shorter propagation delay and/or differential propagation delay of the electrooptical circuit. Which of these characteristics or combinations of characteristics is improved by the present invention depends upon the basic type of optical radiation source, the basic type of optical detector and which combination of types or source and detector are used together.

It is therefore one object of the present invention to provide an improved solid-state electrooptical relay.

Another object of the present invention is to provide a solid-state electrooptical switching circuit utilizing a pair of alternately pulsed light paths.

Another object of the present invention is to provide a solid-state electrooptical switch in which a pair of electrooptical couples are alternately pulsed by high-energy pulses of short duration.

Another object of the present invention is to provide an electrooptical switching circuit having increased speed of operation and improved electrical isolation between the input and output circuits.

Another object of the present invention is to provide a solid-state switch in which two radiation sources are pulsed alternately at the transitions of the incoming logic binary. The monopolar pulses of the two detectors which appear at the detector outputs alternate according to the timing of the input signal and are fed to an output logic element. The output logic element accepts the two separate signals of the same polarity but different timing and changes its state in the usual bistable fashion so as to imitate the data states of the input logic element. The improvement of a data channel using two optical couples is thus greater than a factor of 2. It is increased by some ratio of the new radiation level to that of the level allowable with a single couple. Since the only information of interest is logic transition timing and polarity, the duty cycle can be made quite low.

These and further objects and advantages of the invention will be more apparent upon reference to the following specification, claims, and appended drawings, wherein:

The present invention is based upon the use of a radiation source whose maximum output is average power (not instantaneous) limited and which is coupled to a photon detector whose performance is increased by increased radiation. That is, increased radiation from the radiation source increases the signal-to-noise ratio, load impedance time constant, or some other characteristics of the detector.

Figure 1:
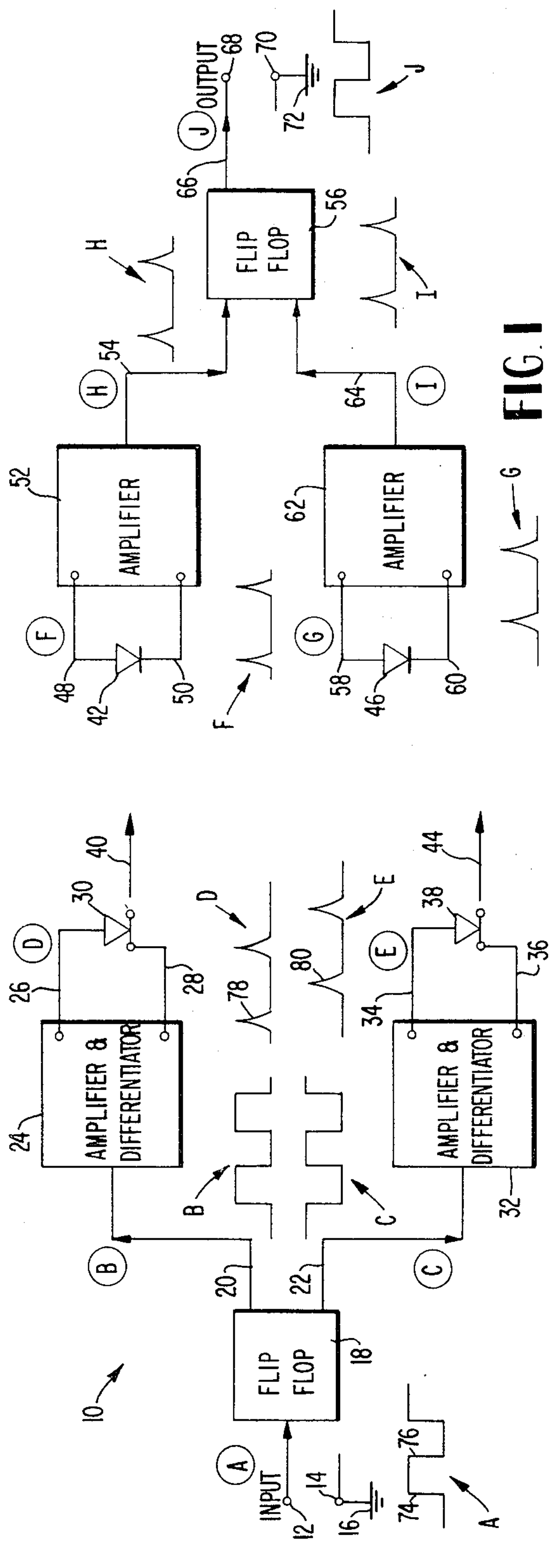
FIG. 1 is a simplified block diagram of the novel double optical path isolator switch or relay of the present invention.

Referring to the drawings, FIG. 1 is an overall block diagram of the novel solid-state isolator switch of the present invention. Various points in the circuit are labeled A through J in FIG. 1. The corresponding waveforms at these points in the circuit are similarly labeled and indicated by arrows. The switch generally indicated at 10 comprises a pair of input terminals 12 and 14, one of which may be grounded as indicated at 16. From these terminals an input is fed to an input logic element 18 in the form of a bistable or flip-flop having a zero output 20 labeled B and a 1 output 22 labeled C. Output 20 from logic element 18 is fed to a combination differentiator and amplifier 24 where the signal is first differentiated and then amplified to form a relatively high-amplitude pulse of short duration. This pulse appears on output leads 26 and 28 as indicated at D and passes through a first light source 30. Light source 30 is in the form of a solid-state element whose maximum output is average power rather than instantaneous power limited. By way of example only, light source 30 may take the form of a diffused gallium arsenide PN-junction which emits narrow spectrum infrared radiation when biased in the forward direction. It produces what is called forward injection electroluminescence which does not depend upon the heating of an element or the ionization of a gas and inherently has a high operating speed. It is, of course, understood that the light source may take the form of other solid-state devices for emitting radiation either in the visible spectrum, in the infrared or in the ultraviolet range.

Output 22 from logic element 18 passes to a second combination differentiator and amplifier 32 which is in all respects similar to the differentiator and amplifier 24. A high-amplitude and high-power pulse of short duration appears at the output of element 32 on leads 34 and 36 indicated at E and this pulse passes through a second solid-state light source 38 in all respects similar to the light source 30.

Photons emitted from light source 30 pass through a suitable light-conducting medium, such as air, as indicated at 40, and impinge upon a photon detector 42 which is preferably a solid-state element and more particularly a photoconductive diode. Similarly, photons indicated at 44 emitted by radiation source 38 pass through a medium such as air and impinge upon a second photodetector 46 in all respects similar to the photoconductor diode 42. Diodes 42 and 46 are of conventional construction and evidence the property that their performance is increased by an increase in the intensity of radiation impinging upon them. Specifically, the preferred embodiment of the present invention provides an increase in switching speed of the circuits incorporating diodes 42 and 46 resulting from the higher intensity of the photon radiation 40 and 44 resulting from the high-energy short duration pulses applied to the photon or radiation sources 30 and 38.

The output from detector 42 indicated at F is fed by way of leads 48 and 50 to an amplifier 52 and from this amplifier by way of lead 54 to one input of an output logic element 56 again in the form of a bistable or flip-flop. The output labeled H from amplifier 52 is illustrated as applied to the zero input of bistable 56. Similarly, an electrical signal from detector 46 labeled G is fed by way of leads 58 and 60 to a second amplifier 62 in all respects similar to amplifier 52 previously described. From amplifier 62, a signal is fed by way of lead 64 to the "one" input of bistable 56. The output from the second logic element or bistable 56 is fed by way of lead 66 to a pair of output terminals 68 and 70, the latter indicated as grounded at 72.

In FIG. 1, a typical digital data input is indicated by the waveform A and this input is illustrated as applied to the input terminals 12 and 14. The wave form A is a plot of voltage as a function of time and arbitrarily indicates a positive pulse as representing a binary zero logic state and a no pulse represents a binary "one." If desired, the logic states can be reversed with the positive pulse representing a binary one and a space representing a binary zero. The zero pulse is illustrated as having a leading edge 74 and a trailing edge 76 defining the beginning and end of a logic zero state. By way of example only, leading edge 74 causes the flip-flop 18 to produce a positive going pulse on the zero output lead 20 and the trailing edge 76 of the input waveform causes the flip-flop to change state and produce a positive going pulse on the binary one logic output lead 22. The waveforms on the flip-flop output leads 20 and 22 are illustrated at B and C, respectively. It can be seen that one waveform is the complement of the other.

Amplifier 24 acts as a differentiator in that it senses the leading edge of a positive going pulse in the waveform B and produces at its output a high-energy pulse such as pulse 78 illustrated in waveform D having a very short duration. Similarly, amplifier 32 acts as a differentiator in that it senses the leading edge of the pulses in waveform C and produces high-intensity short duration pulses 80 illustrated by the waveform E. Since pulses 78 and 80 are formed from the leading edges of the complementary waveforms B and C, they are spaced by one-half the repetition period of the input waveform A. These pulses produce alternate short high-intensity bursts of radiation from the respective photon sources 30 and 38 such that the sources are heavily overdriven for very short periods of time so that the duty cycle for each source is very low and the sources are not damaged by the high-intensity pulses 78 and 80.

The short bursts of high-intensity radiation from the photon sources 30 and 38 cause the photodetectors 42 and 46 to switch very rapidly. That is, the photodetectors 42 and 46, when the radiant energy 40 and 44 respectively impinges upon them, switch from the substantially nonconducting condition rapidly into heavy conduction, which heavy conduction lasts for the short duration of the radiant energy burst from the photon sources. The result is that the photodetectors 42 and 46 produce short high-intensity electrical pulses illustrated by the waveforms F and G which are amplified in amplifiers 52 and 62, respectively, and fed to the two inputs of the second or output logic element, i.e., bistable 56. The pulses to the input of bistable 56 maintain the half-period separation and cause one of the outputs, such as the zero output of the bistable on lead 66, to alternately switch between a zero and a one state as indicated by the waveform at J.

By alternately overdriving the light sources 30 and 38 for very short periods of time, it is possible to far more than double the date transmission rate through the isolator switch, thus making the switch usable in all types of digital data circuits, including both teletype circuits and other digital data circuits which require a much higher speed of operation. Electrical isolation between the input and output circuits of the switch is determined to a large extent by the isolation between the respective electrooptical couples, i.e., the isolation between photon source 30 and photodetector 42 and the isolation between photon source 38 and photodetector 46. With air as the medium between the light sources and light detectors, this spacing may vary from about an inch to as much as 12 inches or more. Greater efficiency in radiant energy transfer may be obtained by inserting a suitable light guide, such as, for example, a fiber optic bundle between the respective photoemitters and photodetectors.

Figure 3:
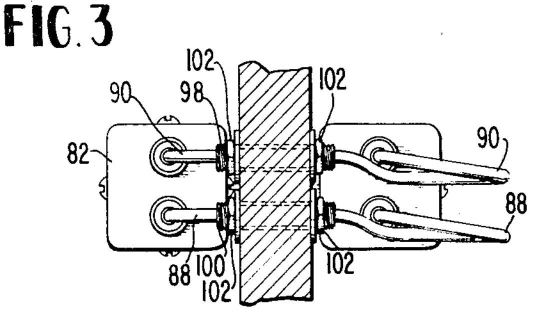
FIG. 3 is a plan view of the physical layout of FIG. 2.
Figure 2:
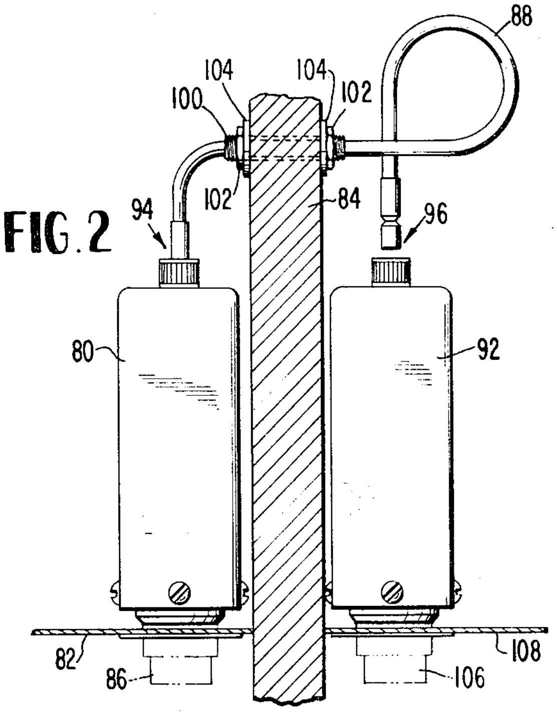
FIG. 2 is an elevational view with parts in section showing a physical construction for the circuit of FIG. 1.

FIGS. 2 and 3 show one physical embodiment of the isolator switch illustrated in FIG. 1. In FIG. 2, the input half of the switch comprising logic element 18, amplifier and differentiator elements 24 and 32, and the light sources 30 and 38 are contained in an input package or shielded housing 80. This housing is mounted on a suitable bracket 82 attached to a supporting wall 84. Support 84 by way of example only may constitute the wall of a room the inside of which is to be electrical isolated from the outside of the room. The electrical input is supplied to the circuitry within input housing 80 by way of a suitable electrical connector 86 and the radiant energy from input housing 80 passes by way of a pair of flexible light guides 88 and 90 through wall 84 to a similar output package or shielded housing 92 containing the photodetectors 42 and 46, amplifiers 52 and 62 and the output logic element 56 of FIG. 1. The flexible light guides preferably take the form of fiber optical bundles and are attached to the respective housings 88 and 92 by suitable connectors generally indicated at 94 and 96.

Passing through a pair of suitable apertures in wall 84 are a pair of conductive metal tubes or bushings 98 and 100 which are preferably of circular cross section externally threaded at their ends to receive hex nuts 102 which overlie washers 104 and secure the bushings to wall 84. Bushings 98 and 100 preferably are dimensioned so as to operate as waveguides with a cutoff frequency well above the highest frequency of interest of the electrical signals appearing on the input side of the ground plane. That is, the cross-sectional dimensions of the bushings are sufficiently large such that the high-frequency light is propagated through the bushings by way of light guides 88 and 90 but the cross-sectional dimensions of the bushings are sufficiently small so that the lower frequency electromagnetic radiation at the input package 80 are not supported in the bushings and therefore will not pass through the wall 84. By so dimensioning the bushings electrical isolation between the input and output packages 80 and 92 is further enhanced. Output electrical signals may be derived from the output connector 106 on output package 92 which is supported by a bracket 108 from the other side of wall 84.

The need for isolation devices arises from the desire to remove from the communications signal all other signals, both transverse (cross-pair) and longitudinal (common-mode) which should not pass between the signal source and its load or pass beyond a specified point in the signal route. This is a common requirement with respect to typical radiofrequency interference problems. Since the unwanted signals and noise may fall within the band-pass of the desired electrical signal it is not possible to employ passive filters. In the present invention isolation may be provided by interposing the isolation switch in the signal line to propagate the signal by optical radiation, thus breaking the electrical conductor path. Almost complete isolation against longitudinal (common-mode) unwanted signal coupling is obtained. In FIG. 2 the nonmetallic light guides 88 and 90 are interposed between the input package 80 and the output package 92. This makes it possible to propagate signals without a metallic path. This results in an isolation switch which becomes a unidirectional signal repeater covering practically all communication frequencies and isolation requirements. To further enhance isolation the dividing wall such as wall 84 in FIGS. 2 and 3 should be made preferably both electrically conductive and ferromagnetic so as to constitute an electromagnetic ground plane between input package 88 and output package 92. This further enhances isolation between the input and output packages by eliminating space-radiated coupling. The ground plane 84 may be a chassis wall or a shield room wall. The light beam then passes through the ground plane by means of waveguides in the ground plane formed by the two bushings 98 and 100. The dimensions of the waveguide are chosen so that its cutoff frequency is above the highest frequency of interest. These waveguides should be chosen with two factors in mind. First, the wavelength of the highest frequency of interest must be large compared to the internal diameter of the bushing. Second, the ratio of the length of the waveguide to the diameter determines the amount of attenuation below the cutoff frequency. Thus, the diameter should be sufficiently small and the length of the bushings sufficiently long that little or no electromagnetic propagation through the bushings can take place at the frequencies existing at the input package 80.

Figure 4:
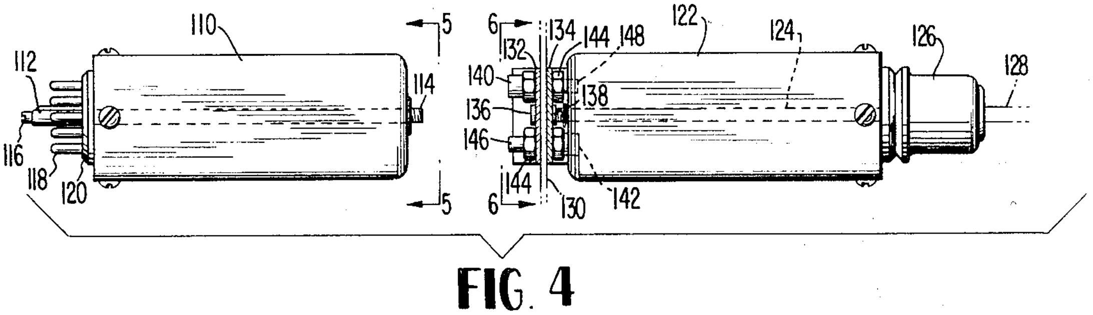
FIG. 4 is an elevational view of a modified embodiment of the present invention, i.e., a different physical layout for the isolator switch or relay of FIG. 1.
Figure 5:
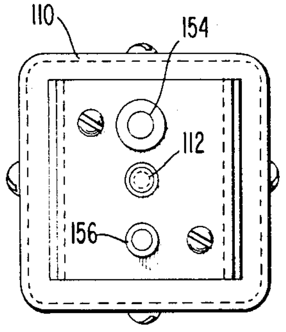
FIG. 5 is a view taken along line 5—5 of FIG. 4.
Figure 6:
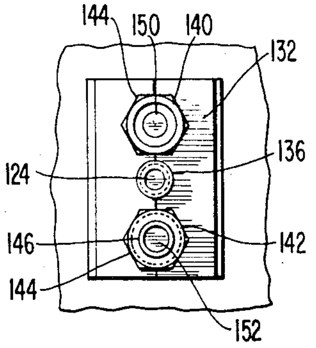
FIG. 6 is a view in the opposite direction taken along line 6—6 of FIG. 4.

FIGS. 4 through 6 illustrate a second physical embodiment of the isolator switch of FIG. 1. In this embodiment the flexible light guides are eliminated and the input and output packages are rigidly connected together. Referring to these figures the input package 110 again comprises a metal shielding housing or casing containing the flip-flop 18, amplifier and differentiators 24 and 32 and light sources 30 and 38 of FIG. 1. Passing through the center of input package 110 is a holddown rod 112 threaded at one end 114 and having a socket 116 at its other end adapted to receive the blade of a screwdriver. Electrical input to the circuitry within input package 110 is by way of pins 118 of a conventional connector plug 120. Also illustrated in FIG. 4 is an output package 122 similarly comprising a shielding metal housing in which is located the detectors 42 and 46, amplifiers 52 and 62 and flip-flop 56 of FIG. 1. A similar holddown rod indicated by dash lines at 124 passes through the center of output package 122 and electrical output is taken from this package by way of a similar connector illustrated at 126. Connector 126 is illustrated in FIG. 4 as forming the termination for a conventional multiconductor cable indicated at 128 and it is understood that the input connector plug 120 is similarly constructed for mating with the female portion of a connector similar to the output connector 126 and forming the termination for a conventional input multiconductor cable.

Positioned between the input and output packages 110 and 122 is an electrically conducting ground plane 130 which may be a shield room wall, chassis wall, or the like. On opposite sides of ground plane are respective U-shaped brackets 132 and 134 each having an internally threaded tubular projection 136 and 138 adapted to receive the threaded ends of the respective holddown rods 112 and 124. The generally U-shaped brackets 132 and 134 are apertured to receive a pair of light guide tubes or bushings 140 and 142 which pass through ground plane 130 and are secured by hex nuts 144. One end of each of the tubes or bushings 140 and 142 is formed with a reduced diameter as at 146 and 148 and rigidly held by the reduced end of their respective bushing are rigid light guides 150 and 152 as best seen in FIG. 6. The projecting ends of the tubes are received in corresponding sockets in the input and output modules or packages such as the sockets 154 and 156 illustrated in FIG. 5.

The operation of the physical embodiment of FIGS. 4 through 6 is essentially the same as the previous embodiment of FIGS. 2 and 3. First the brackets 132 and 134 are mounted on the ground plane which is suitably apertured to receive the waveguide tubes 140 and 142. These are dimensioned to operate well below cutoff for the highest frequency electromagnetic energy at the input package 110. The recessed ends of the packages 110 and 122 are slipped over the flanges of the brackets. A screwdriver is inserted into the heads of the respective holddown rods such as head 116 of FIG. 4 and rods are threaded into the respective tubular projections 136 and 138. The rods are tightened down and the bracket flanges not only help to support the packages but also assure a proper alignment so that the waveguide tubes are properly received in the sockets of each of the input and output packages. The embodiment of FIGS. 4 through 6 constitutes a rigid construction and eliminates the necessity for the flexible light guides or fiberoptic bundles of the embodiment of FIGS. 2 and 3.

Figure 8:
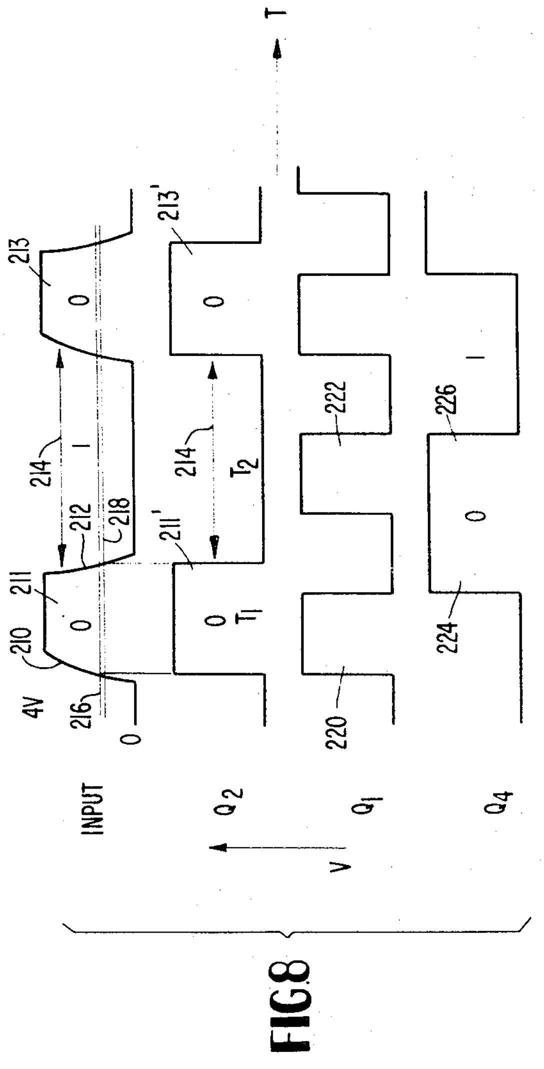
FIG. 8 is a diagram of the waveforms appearing at various locations in the circuit of FIG. 7.
Figure 7:
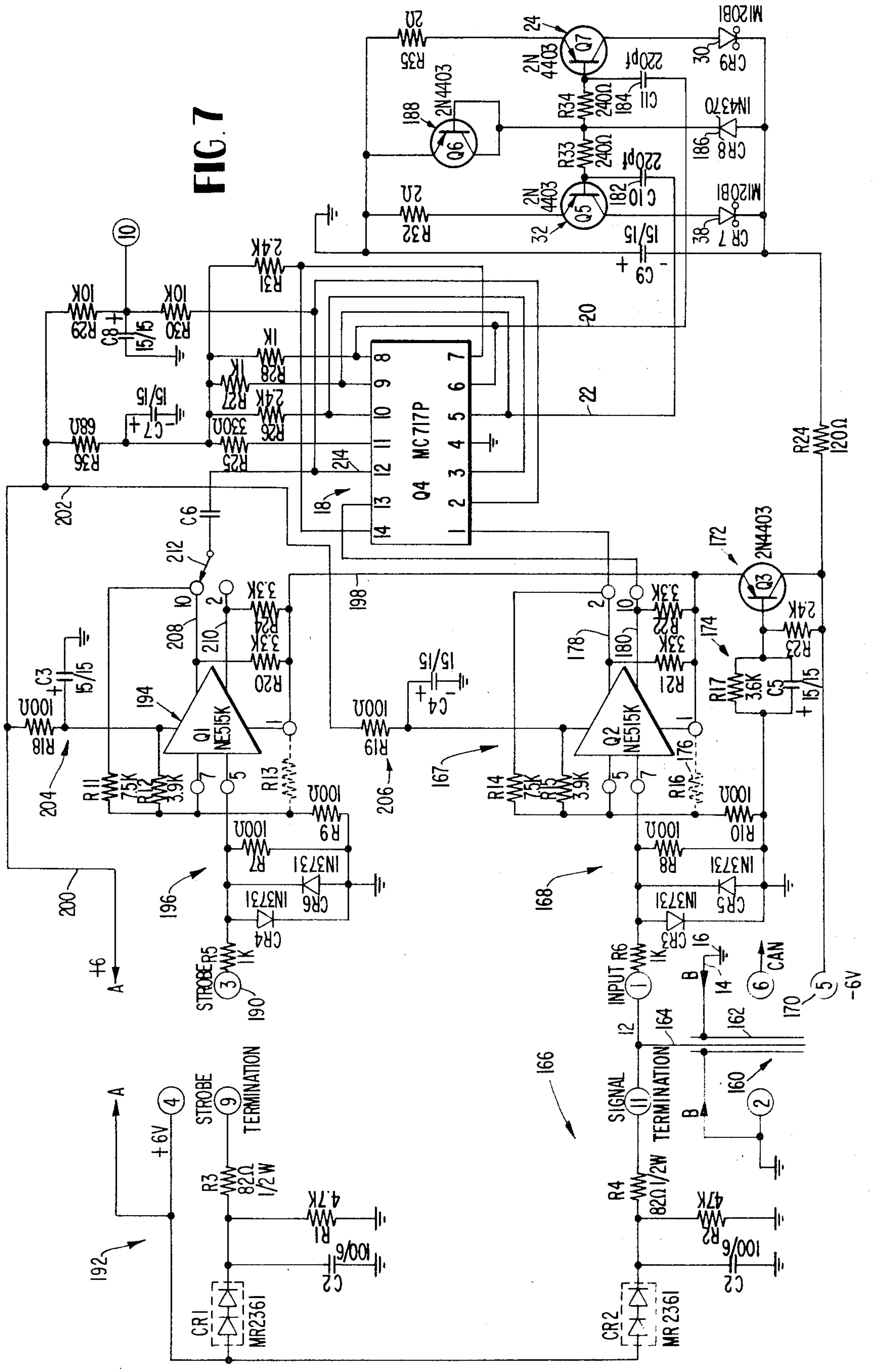
FIG. 7 is a detailed circuit diagram of the input side of the isolator switch of the present invention.

FIG. 7 is a detailed circuit diagram of the input circuitry for the switch contained within the input module or package 80 of FIGS. 2 and 3 or the corresponding input package 110 of FIGS. 4 through 6. FIG. 7 is a more detailed showing of the input portion of the generalized block diagram of FIG. 1 and like parts in FIG. 7 bear like reference numerals. FIG. 8 is a waveform diagram for the strobing circuit incorporated in FIG. 7 and described in detail below.

Referring to FIG. 7, the input signal is applied to input terminals 12 and 14 from a suitable feedline such as a coaxial cable illustrated generally at 160 comprising a grounded outer conducter 162 and a central conductor 164 connected to input terminal 12. A signal termination circuit 166 is connected to the coaxial cable so as to terminate the cable in its characteristic impedance. The parameters for the termination circuit 166 illustrated in FIG. 7 are selected for input coaxial cable 160 having a characteristic impedance of 75 ohms. From input terminal 12 the signal then passes to a wave-shaping bistable circuit 167 which includes integrated circuit Q2 and takes the form of a Schmitt trigger. Connected across the input of the Schmitt trigger 167 is a safety circuit generally indicated at 168 comprising a plurality of clipper diodes to prevent integrated circuit Q2 from being overdriven. Power is supplied to the integrated circuit Q2 from a suitable −6-volt power supply connected to terminal 170 by way of a suitable power supply regulator generally indicated at 172 and including transistor Q3 and isolating filter 174. A resistor 176 is shown in dash lines and may or may not be used depending upon the level of the input signal. The various resistors connected to integrated circuit Q2 form the Schmitt trigger configuration and their values determine the triggering or slicing level of the bistable. The output from Schmitt trigger 167 is by way of reset lead 178 and set lead 180 to the reset and set terminals respectively of an integrated circuit flip-flop or first bistable logic element 18 which by way of example only may take the form of a dual quad gate. Integrated circuit Q4 and its associated circuitry corresponds to the first bistable or flip-flop 18 of FIG. 1 and is similarly numbered. An output from bistable 18 is taken by way of leads 20 and 22 in FIG. 7 through respective capacitors 182 and 184 to a pair of transistors Q5 and Q7. The signal is differentiated by capacitors 182 and 184 and amplified in transistors Q5 and Q7 respectively. Capacitor 182 and transistor Q5 correspond to element 32 of FIG. 1 and similarly capacitor 184 and transistor Q7 correspond to element 24 of FIG. 1.

Connected in the collector circuits of the transistors are the light sources 30 and 38. They are connected in a balanced circuit including a zener diode 186 and transistor diode 188 labeled Q6. Transistors Q5 and Q7 are poled so that they turn on with negative impulses on the respective leads 20 and 22. It is of course apparent that the polarity could be reversed and the amplifiers triggered by positive impulses if desired. Transistor diode 188 constitutes a base-emitter offset diode for the amplifiers Q5 and Q7.

Also shown in FIG. 7 is a strobe input terminal 190 for strobing flip-flop 18 from a suitable system clock or time base source. Since the strobe signal is customarily supplied by a separate coaxial conductor the circuit of FIG. 7 includes a second termination circuit or strobe termination circuit 192 for similarly terminating the strobe input conductor in its characteristic impedance. A clock signal on strobe input 190 is fed to a second Schmitt trigger 194 including integrated circuit Q1 which is in all respects similar to the Schmitt trigger 167 previously described. Again the signal is supplied to the Schmitt trigger input by way of a safety circuit 196 to prevent the transistor from being overdriven. One side of the Schmitt trigger 194 is returned to the –6-volt supply at terminal 170 by way of lead 198 while the other side of the Schmitt trigger is connected to a +6-volt supply by way of lead 200. The +6-volt supply is also connected by way of lead 202 to one side of Schmitt trigger 167 the other side of which as previously described is connected through regulator circuit 172 to the –6-volt supply terminal 170. The positive power supplies are similarly isolated from the Schmitt triggers for RF by respective isolating filters 204 and 206. One of the output leads 208 and 210 of Schmitt trigger 194 is connected by a jumber 212 to the toggle input 214 of flip-flop 18. Jumper 212 permits phase selection between the two outputs of the Schmitt trigger 194.

The incorporation of a strobe circuit is optional in the switch of the present invention but it provides the advantage of controlled time coincidence between the output and the system time reference (clock) as well as reestablishment of the data bit width (reduces distortion).

The operation of the circuit in FIG. 7 and particularly the operation and purpose of the strobe may be best understood in conjunction with a consideration of the waveforms illustrated in FIG. 8. These waveforms are a plot of voltage as a function of time and are illustrated by way of example only in conjunction with a signal level to input terminal 12 which varies between zero and 4 volts. The first waveform in FIG. 8 shows the input to terminal 12 of the switch. The second waveform labeled Q2 is one of the outputs from Schmitt trigger 167. The third waveform labeled Q1 is the output from the strobe Schmitt trigger 194 and the waveform labeled Q4 shows one of the outputs from logic element or bistable 18.

Theoretically the input to terminal 12 is a perfect square wave having equal positive and negative half repetition periods. In practice, however, the input signal to terminal 12 often incorporates a substantial amount of distortion and this distortion is illustrated by the first waveform in FIG. 8. That is, the positive going pulse conventionally has a substantially distorted, i.e. curved, leading edge 210 and also a distorted trailing edge 212. In addition the spacing between the pulses is very often not equal to the pulse width, i.e., the distance 214 in FIG. 8 between successive input pulses 211 and 213 is illustrated as substantially greater than the pulse width. In other words the half periods of the input waveform are not equal.

By passing the input pulses 211 and 213 through the Schmitt trigger 167 a squarer wave is obtained and this is illustrated by the waveform Q2 in FIG. 8. That is the Schmitt trigger 167 will be triggered by the leading edge 210 of an incoming pulse when it reaches a predetermined level (approximately 1.5 volts positive) as indicated by the line 216. Similarly the Schmitt trigger will be triggered into its other state by the trailing edge 212 of the incoming pulse 211 at a very similar predetermined level indicated at 218 (say 1.4 volts positive) as determined by the parameters of the Schmitt trigger 167. As a result the output from the Schmitt trigger or waveform Q2 has substantially rectangular impulses 211′ and 213′ with very sharp leading and trailing edges. However waveform Q2 still evidences time distortion in that the distance 214′ between successive pulses is still much greater than the pulse width, i.e., $T_2$ is still substantially greater than $T_1$ whereas ideally the pulse spacing should be equal to the pulse width.

This time distortion when it exists) may be eliminated by the toggle circuitry shown and described. A timing signal is supplied to the strobe input 190 from the system clock at a repetition rate preferably twice the rate of the date input waveform to input terminal 12. This clock signal passes through Schmitt trigger 194 where the amplitude distortion is removed in a manner similar to its removal in the Schmitt trigger 167 to produce at the output lead 208 of Schmitt trigger 194 the third waveform in FIG. 8 labeled $Q_1$.

These clock pulses 220 and 222 are at twice the data repetition rate such that two complete cycles of the clock waveform corresponds to a single cycle or single period of the data input waveform. These pulses are supplied to the toggle input 214 of the bistable 18 so as to toggle the bistable and to permit its output to assume a state dependent upon the condition of its input, i.e., whether a positive pulse appears on reset lead 178 or set lead 180. For example, with the toggle jumper 212 connected to output lead 208 of toggle Schmitt trigger 194, bistable 18 is toggled by the trailing edge of the clock pulses 220 and 222. Since the trailing edge of the first toggle pulse 220 coincides with a positive data input pulse 211 bistable 18 will switch to a zero condition as indicated by the positive pulse 224 in the waveform labeled Q4 in FIG. 8. However, the trailing edge of the next clock pulse 222 coincides with a space position in the data input waveform so that at the occurrence of the trailing edge of the second clock pulse 222 the bistable senses a no pulse or a space condition at its input and flips back to the one state as indicated at 226 in waveform Q4. The result is that the output of bistable 18 is a square wave in which the half-periods are equal as determined by the trailing edges of the clock pulses which do not evidence the time distortion of the data input. Since the clock pulses are at twice the repetition of the date pulses the trailing edge of the clock pulses coincide with the centers of either the mark or space position of the date pulses and therefore the bistable output is substantially independent of data pulse distortion. The other output from the bistable is of course the complement of the waveform Q4 of FIG. 8. By switching the toggle jumper 212 to the Schmitt trigger output 210 it is possible to toggle the bistable with the leading rather than with the trailing edge of the clock pulses.

Figure 9:
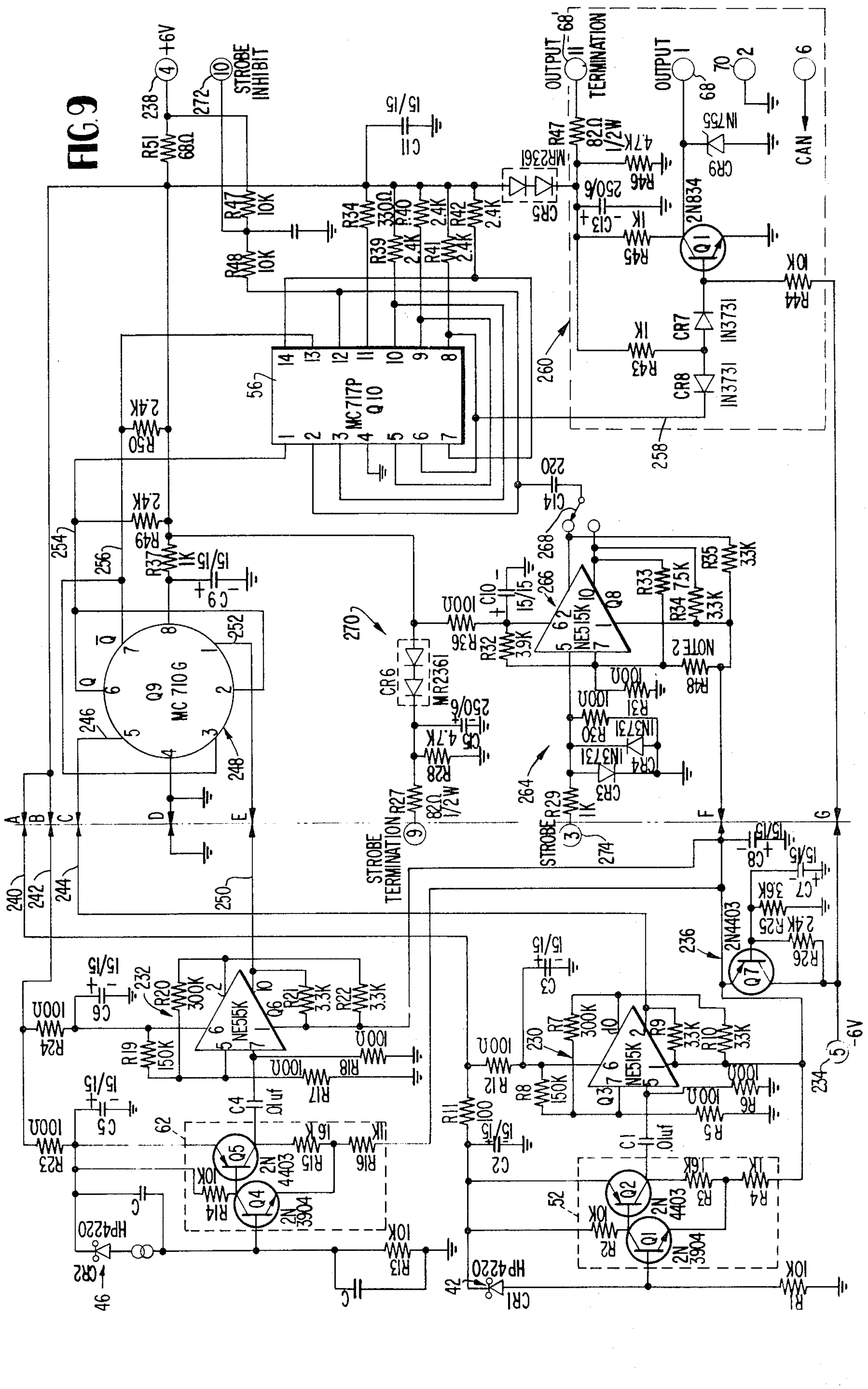
FIG. 9 is a detailed circuit diagram of the output side of the isolator switch or relay.

FIG. 9 is a detailed circuit diagram of the output half of the isolator switch of the present invention, i.e., that portion of the circuit contained within the module package 92 of FIGS. 2 and 3 or 122 of FIGS. 4 through 6. FIG. 9 is a more detailed circuit diagram of the output half of the generalized block diagram of FIG. 1 and again like parts bear like reference numerals. In FIG. 9 the photodetectors are again indicated at 42 and 46. These photodetectors may be any conventional solid-state photoconductors and preferably take the form of a silicon junction diode or more particularly a PIN-diode. Diode 42 is connected through a feedback amplifier indicated by the dashed box 52 and including transistors Q1 and Q2 in FIG. 9, to a Schmitt trigger 230 including integrated circuit Q3. Photodetector 46 is similarly connected through a feedback amplifier indicated by the dashed box 62 including transistors Q4 and Q5 to a Schmitt trigger 232 including integrated circuit Q6. The Schmitt triggers 230 and 232 are similar to those previously described. The circuit is connected to a –6-volt power supply terminal 234 through a power supply regulator 236 including transistor Q7 and to a +6-volt power supply terminal 238 by way of leads 240 and 242 through a suitable isolating filter circuit. The output from Schmitt trigger 230 is applied by way of lead 244 to reset terminal 246 of a bistable or flip-flop 248 and the output of Schmitt trigger 232 is supplied by way of lead 250 to the set terminal 252 of bistable 248. Bistable 248 acts as a squaring amplifier and while not essential has the advantage that it makes it possible for the circuit to employ the high-power faster going edges of the pulses, i.e., normally the leading edges. The outputs from bistable 248 are fed by way of leads 254 and 256 to the set and reset terminals of the output logic element bistable 56 which again preferably takes the form of an integrated dual quad gate. The output from bistable 56 is fed by way of lead 258 to an output cable driver indicated by the dashed box 260. The output cable driver includes output terminals 68 and 70 with an optional output terminal indicated at 68'. These terminals may feed a conventional 75 -ohm characteristic impedance output coaxial cable.

Also provided in the output half of the switch is a strobe circuit 264 including Schmitt trigger 266 which feeds an output over toggle jumper 268 to bistable 56. The output half of the switch also includes a strobe termination circuit 270. The strobe circuit 264 operates in the same manner as than previously described. If desired the strobe circuit may be inhibited or disabled by connecting strobe inhibit terminal 272 to a suitable reference potential so that the circuit will operate independent of a clock signal applied to strobe terminal 274. Strobe circuits are included in both the input and output sides of the switch for convenience. It is understood that normally the switch is strobed on either the input side or the output side of the switch but not both, depending on which side of the switch is more accessible for connection to the system clock.

It is apparent from the above that the present invention provides an improved isolation switch and particularly one that is capable of very high-speed operation making it suitable for use in all kinds of digital data circuits. An important feature of the present invention includes the provision of a pair of optical couples, i.e., a pair of optical sources and detectors which are alternately overdriven on very short duty cycles. This makes possible a very rapid turnoff and turn-on of the switch significantly increasing the speed at which it may operate. Logic phase reversal is incorporated in the circuit by simply reversing the connections of the light guides at either end. Also incorporated in the switch input and output circuits are noise and distortion eliminating circuits in the form of strobes and Schmitt triggers. Finally cable termination and drive networks are provided so that the isolator switch may be readily inserted in a conventional coaxial cable line.

While described in conjunction with preferred light sources and light detectors the switching circuit of the present invention is adapted for use in conjunction with almost all types of solid-state electroluminescent sources and solid-state photodetectors since the operation of almost all of these devices is enhanced by increasing the permissible radiation levels which is made possible through the use of the short duty cycle of the switch of the present invention. Furthermore, while the invention has been described in conjunction with an infrared source detector it is equally applicable to other types of optical sources and detectors which operate in the visible and ultraviolet as well as the infrared sprectrum.

In addition to increasing the speed of operation of the switch other characteristics of the switch may be optimized as desired including the provision of increased frequency and bandwidth, increased signal-to-noise ratio, reduced transmitter power consumption, faster signal rise-time, shorter propagation delay and/or differential propagation delay of the electrooptical circuit. Which of these characteristics or combinations of characteristics is improved by the switch of the present invention is dependent upon the ultimate use and the types of radiation sources and detectors utilized.

Increased electrical isolation is afforded by the physical constructions including a separating ground plane, and light guides (particularly fiber optic bundles) passing through tubular waveguides operating below cutoff for the highest frequency of electromagnetic energy existing in the switch components. In addition to common-mode signal isolation the switch of the present invention also provides improved transverse mode isolation since the input package or module circuitry light source is electrically saturated on or off and therefore does not respond to a superimposed undesired signal as long as the total instantaneous value does not exceed the trigger point for the opposite transition. During a normal transition of the input signal the input circuitry is insensitive until one boundary of the trigger-band is reached at which point the internal circuitry is toggles independent of the input transition time to the new saturated state. Also provided is an improved timing isolation which acts to remove time jitter in the output caused by excessive transverse noise on the input signal. This is accomplished in the switch of the present invention by feeding an external clock signal to either the input module or the output module to toggle either the input or the output. The clock since it is synchronized to the data signal accomplishes midbit signal timing regeneration.

This invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An isolator switch comprising a pair of optical couples, an input logic element having a signal input and complementary outputs, respective outputs being connected to respective optical couples, and a logic output element connected to both said optical couples for recovering the signal at the input of said input logic element.

2. A switch according to claim 1 in which said logic elements are both bistables.

3. An isolator switch comprising a pair of optical couples, an input bistable, means connecting said input bistable to said optical couples for alternately energizing said couples in accordance with a change in state of said input bistable, and an output bistable, said optical couples being respectively connected to the set and reset terminals of said output bistable whereby said output bistable changes state in response to energization of said couples.

4. A switch according to claim 3 wherein said means connecting said input bistable optical couples comprises means for supplying high-energy, short duration impulses to said optical couples.

5. A switch according to claim 4 including an amplifier and differentiator connecting complementary outputs of said input bistable to respective optical couples.

6. An isolator switch comprising a pair of optical couples each including a photon source and a photodetector, an input bistable, means coupling said input bistable to said photon sources for alternately overdriving said sources in response to a change in state of said input bistable, an output bistable having set and reset terminals, and means coupling said terminals to respective photodetectors whereby said output bistable changes state in response to alternate energization of said sources.

7. A switch according to claim 6 wherein said sources and photodetectors are all solid-state elements.

8. A switch according to claim 6 including separate light guides coupling respective sources and photodetectors.

9. An isolator switch comprising a pair of solid-state photon sources, a pair of photodetectors, a separate light guide coupling respective sources and detectors, an input terminal, a first bistable having its input connected to said input terminal and having a pair of complementary outputs, a first amplifier and differentiator connecting one of said outputs to one of said sources, a second amplifier and differentiator connecting the other of said outputs to the other of said sources, a second bistable having an output terminal and set and reset inputs, means coupling one of said detectors to said set input, and means coupling the other of said detectors to said reset input.

10. A switch according to claim 9 wherein said detectors are coupled to said second bistable through amplifiers.

11. A switch according to claim 9 wherein said light guides are rigid.

12. A switch according to claim 9 wherein said light guides are flexible.

13. An isolator switch comprising an input shield casing, a pair of photon sources in said input casing, a bistable in said input casing having complementary outputs coupled to respective sources, an output shield casing, a pair of photodetectors in said output casing, a bistable in said output casing having set and reset terminals coupled to respective detectors, a ground plane between said casings, and a pair of light guides passing through said ground plane and optically coupling respective sources and detectors.

14. A switch according to claim 13 including a pair of waveguides surrounding said light guides, said waveguides being dimensioned to operate below cutoff for the highest electromagnetic frequency to be isolated.

15. An isolator switch comprising a pair of optical couples, an input bistable, means connecting said input bistable to said optical couples for alternately energizing said couples in accordance with a change in state of said input bistable, an output bistable, said optical couples being respectively connected to the set and reset terminals of said output bistable whereby said output bistable changes state in response to energization of said couples, and means coupled to said switch for strobing at least one of said bistables.

16. A switch according to claim 15 wherein said strobing means comprises means for coupling at least one of said bistables to a clock source having a frequency twice the rate of the input signal.

17. A switch according to claim 15 including a cable termination network coupled to said input bistable and a cable driver network coupled to said output bistable.

* * * * *

UNITED STATES PATENT OFFICE

CERTIFICATE OF CORRECTION

Patent No. 3,629,590 Dated December 21, 1971

Inventor(s) Alfred L. Case

It is certified that error appears in the above-identified patent and that said Letters Patent are hereby corrected as shown below:

In Col. 4, line 15, "date" should read --data--.

In Col. 5, line 1, "radiofrequency" should read --radio freauency--.

In Col. 8, line 3, "when" should read --(when--; in lines 6, 36, and 38, "date" should read --data--.

In Col. 9, line 13, "than" should read --that--; in line 31, "turnoff" should read --turn-off--.

In Col. 10, line 2, "toggles" should read --toggled--; in line 40, Claim 4, "bistable optical" should read --bistable to said optical--.

Signed and sealed this 4th day of July 1972.

(SEAL)
Attest:

EDWARD M.FLETCHER,JR.
Attesting Officer

ROBERT GOTTSCHALK
Commissioner of Patents